United States Patent [19]

Bremer et al.

[11] Patent Number: 4,509,171

[45] Date of Patent: Apr. 2, 1985

[54] MODEM MULTIPLEXER SYNCHRONIZATION BY RADIAL MODULATION

[75] Inventors: Gordon Bremer, Clearwater; William L. Betts, Madeira Beach, both of Fla.

[73] Assignee: Paradyne Corporation, Lagro, Fla.

[21] Appl. No.: 447,988

[22] Filed: Dec. 8, 1982

[51] Int. Cl.[3] ............................................. H04J 3/06
[52] U.S. Cl. .................................... 370/100; 375/39; 375/42
[58] Field of Search ..................... 375/39, 42; 370/100, 370/119

[56] References Cited

U.S. PATENT DOCUMENTS

| | | | |
|---|---|---|---|
| 3,943,285 | 3/1976 | Ragsdale et al. | 375/42 |
| 3,955,141 | 5/1976 | Lyon et al. | 375/39 |
| 4,055,727 | 10/1977 | Katoh | 375/39 |
| 4,206,320 | 6/1980 | Keasler et al. | 375/42 |
| 4,347,616 | 8/1982 | Murakami | 375/39 |
| 4,355,397 | 10/1982 | Stuart | 375/39 |
| 4,389,722 | 6/1983 | Hofmeister | 375/39 |

*Primary Examiner*—Douglas W. Olms
*Assistant Examiner*—Kenneth I. Rokoff
*Attorney, Agent, or Firm*—Kane, Dalsimer, Kane, Sullivan & Kurucz

[57] ABSTRACT

This invention provides a digital data communication system which is able to combine two data streams from two data sources at the transmitter end, transmit the data and then separate the streams to two data ports at the receiver end. The system makes use of QAM or PSK modulation, and synchronization between the transmitter and the receiver is maintained by changing the radial component of every other transmitted symbol. At the receiver end the radial components of every other symbols are correlated to detect loss of synchronization. Once such a loss is detected, the receiver is adapted to self-synchronize itself with the transmitter.

4 Claims, 5 Drawing Figures

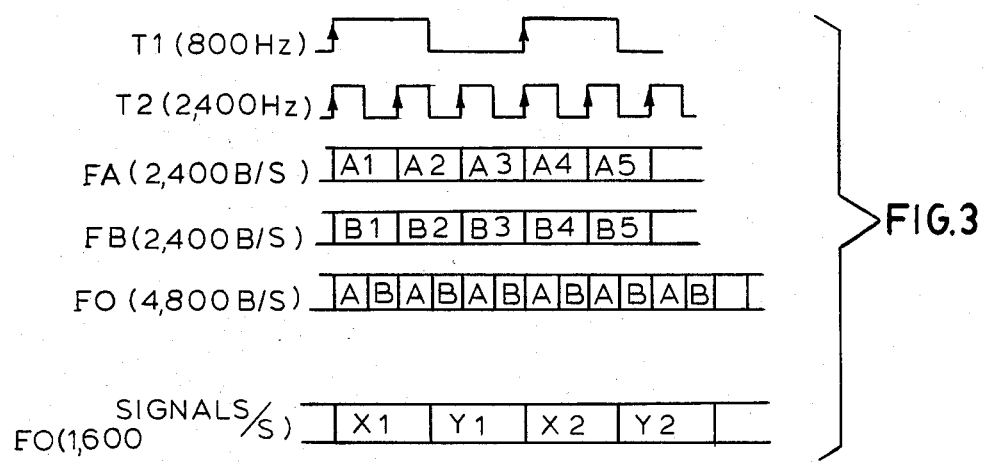
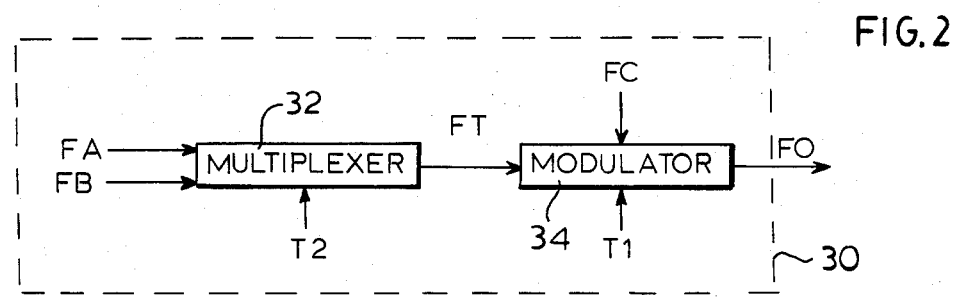
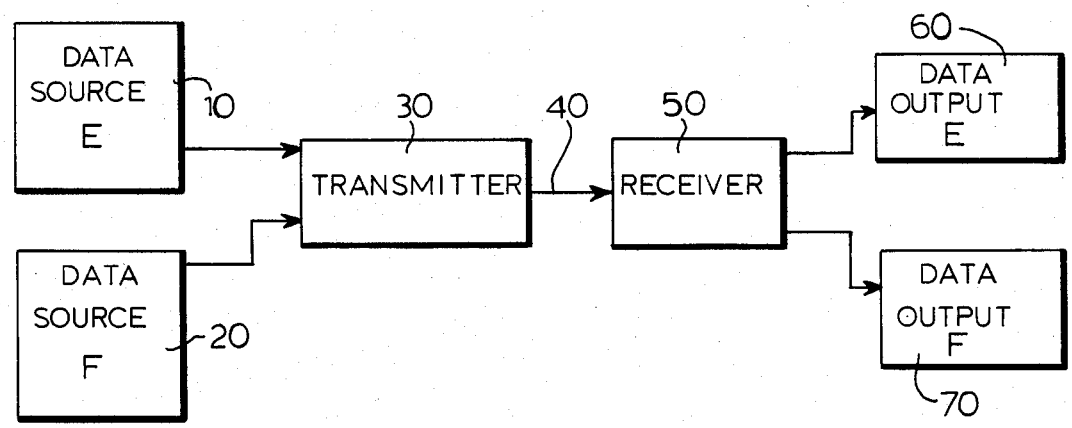

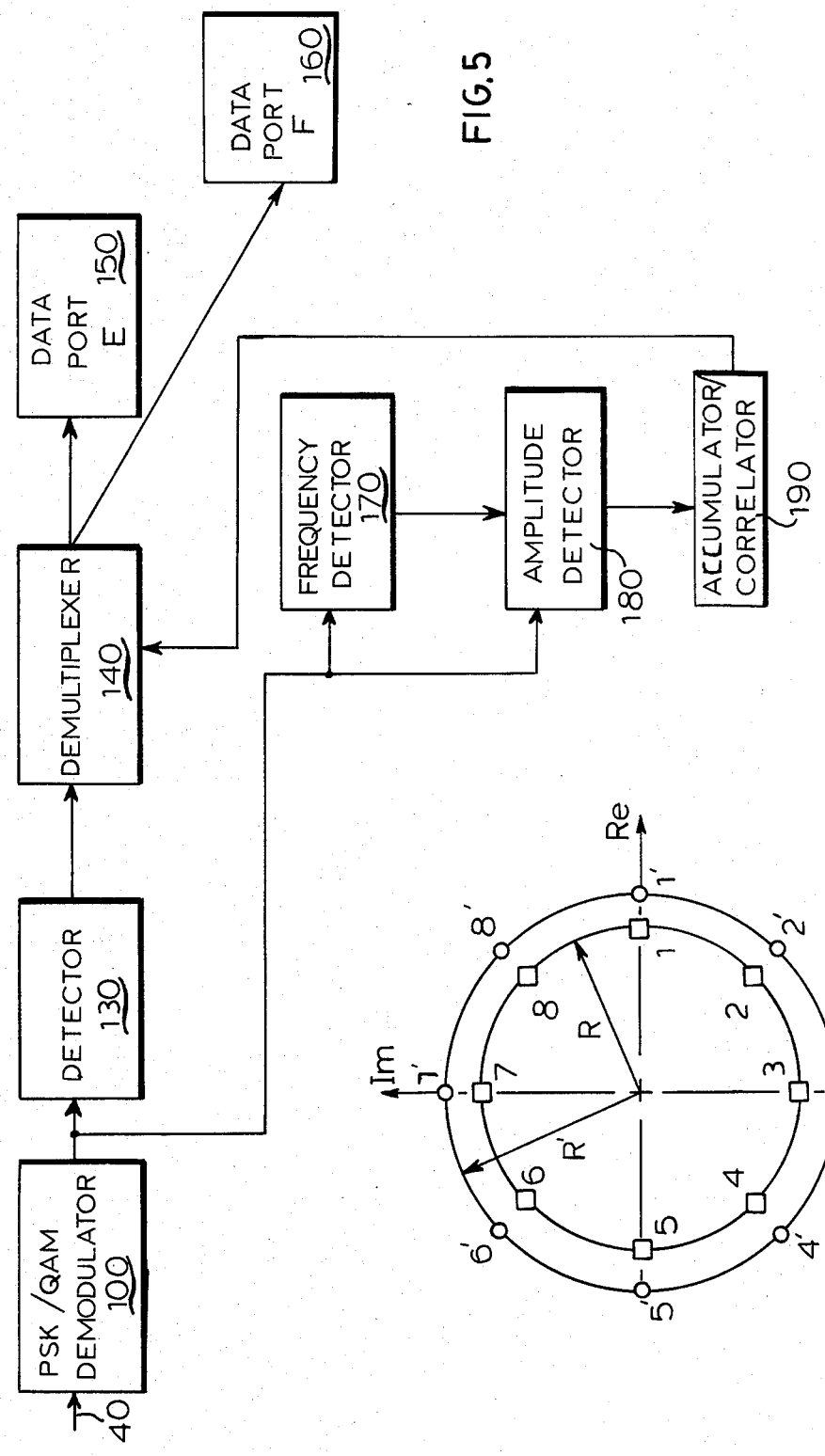

MODEM MULTIPLEXER SYNCHRONIZATION BY RADIAL MODULATION

FIELD OF THE INVENTION

This invention relates to high speed digital communication equipment and more particularly to equipment using QAM or PSK modulation techniques.

BACKGROUND OF THE INVENTION

This invention involves a modem which receives two or more streams or series of bits from respective data sources for transmission. The data bits to be transmitted are combined by multiplexing into a single stream and then arranged into groups of bits, each group defining a transmitted point or symbol. The size of each group depends on the type of modulation used. For example, if two 2,400 b/s streams of bits are combined into a single 4,800 b/s stream and 8-point QAM is used, then each group is formed of three bits. Next, each group of bits is translated into one of the QAM points and then transmitted. At the receiver the process described herein is reversed. During the separation of the bits the transmitter and receiver must by synchronized, otherwise the receiver would not be able to differentiate the bits which originated from different data sources.

Some problems have been encountered during the process of separating the bit stream. More particularly, it has been found that certain channel transmission line impairments cause synchronization between the receiver and transmitter to be lost. One solution to this problem has been proposed in U.S. Pat. No. 3,943,285. According to this patent, one group of signals is differentiated from the next by a $22\frac{1}{2}°$ phase shift. A disadvantage of this method is its susceptibility to error due to phase shift impairments.

SUMMARY OF THE INVENTION

The objective of this invention is to provide a modem with multiplexer self synchronization which includes identification and automatic correction of loss of synchronization.

This objective is achieved according to this invention by providing a transmitter which changes the radius of certain transmitted QAM/PSK points in a predetermined pattern and a receiver which is synchronized by correlating the radial amplitudes of the received points to the same pattern. By changing the radii of the points instead of their phases, errors resulting from channel impairments are reduced. The invention correlates the amplitudes of a number of received points for synchronization instead of just a single signal.

BRIEF DESCRIPTION OF THE DRAWINGS

FIG. 1 shows a method of transmitting two series of data to two respective outputs via a pair of modems;

FIG. 2 shows the components of the transmitter modem;

FIG. 3 is a diagram of the data streams within the transmitter modem;

FIG. 4 is an 8-point QAM eye diagram modified in accordance with the invention; and FIG. 5 shows the components of the receiver multiplexer.

DESCRIPTION OF THE PREFERRED EMBODIMENT

In the preferred embodiment the data from two 2,400 b/s data sources E and F (identified by 10 and 20 respectively in FIG. 1) are supplied to a transmitter modem 30. The transmitter combines the two sets into a single 4,800 b/s data signal which is transmitted over channel 40 to the data receiver 50. The data receiver separates the received signals and sends them at 2,400 b/s to two outputs E and F indicated by numerals 60 and 70 respectively.

The transmitter modem 30 comprises a multiplexer 32 and a QAM-PSK modulator 34 (FIG. 2). The multiplexer 32 combines the two data streams or bit series FA and FB received from data sources E and F respectively at 2,400 b/s and combines them into a single 4,800 b/s data stream FT which is supplied to the modulator 34. The modulator 34 converts this data stream, 3 bits at a time into a third data stream of 8-phase QAM points, or symbols which modulate the carrier frequency FC resulting in the modulated carrier FO. These symbols are then sent out via channel 40. A graphical representation of these data is shown on FIG. 3. T1 and T2 are internal clock signals. The incoming data streams FA and FB comprise data bits A1, A2, A3 . . . and B1, B2, B3 . . . respectively. The combined data stream FT in the form of A1, B1, A2, B2, A3, B3, . . . is converted by the modulator into data stream FO which comprises 8-phase QAM symbols. These QAM symbols are shown on the 8-point eye diagram of FIG. 4, wherein the horizontal axis represents the real or in-phase component of the modulated carrier F0 and the vertical axis represents the imaginary or out-of-phase component of the modulated carrier F0.

In the prior art, a transmitter modem using an 8-point QAM or PSK method of modulation sends out symbols which are represented on the eye diagram as points 1, 2, 3 . . . 8 which have a radial component R. The present transmitter is designed to change the magnitude of every other symbols by a fixed amount so as to send out a stream of symbols whose radial components alternates between R and R' where R' is of different magnitude than R. In the embodiment shown herein R' is larger than R by a fixed amount. R' however, can be arranged in other embodiments as less than R by a fixed amount. At the receiver modem the symbols having radial component R, must be distinguished from those having the radial component R'. F0 is shown on FIG. 3 in the sequence X1, Y1, X2, Y2, X3, Y3 . . . for example. Thus if the first transmitted symbol X1, which is equivalent to bits A1, B1, A2, has the radial component R, the second transmitted symbol Y1, which is the equivalent to bits B2, A3, B3, shall have a radial component R'. Thus all the X symbols are selected from data points 1, 2, 3 . . . 8, and all the Y symbols are selected from data points 1', 2', 3', . . . 8'.

The components of the receiver modem 50 are shown on FIG. 5. The symbols from the channel 40 are detected by demodulator 100. The symbols entering the detector 130 are in the form of QAM points shown on FIG. 4. Since they have different radial components the symbols may be designated as W1, Z1, W2, Z2 . . . . The detector 130 produces a 4,800 b/s stream which is separated by the demultiplexer 140 into two 2,400 b/s data streams, one being sent to data port E, and the second to data port F, designated by numerals 150 and 160 respectively. The data stream generated by the detector 130 corresponds to the data stream that was supplied to the modulator 34 in the transmitter modem 30 (FIG. 2). Thus if, as described above, the data stream A1, B1, A2, B2 . . . is supplied to the modulator 34 which outputs a corresponding symbol stream X1, Y1, X2, Y2 . . . , so that if the first received symbol W1 was X1, the data stream generated by the detector 130 is A1, B1, A2, B2, A3, B3 . . . . The demultiplexer 140 then sends the bits it receives from the detector alternatively to data port E and F, starting with data port E. Thus data port E, 150, receives bits A1, A2, A3 . . . which originated from data source A (10 on FIG. 1), and data port F, 160, receives bits B1, B2, B3 . . . which originated from data source B (20 on FIG. 1).

The above-described operation takes place when the transmitter and the receiver are synchronized. However, if for any reason, the synchronization between the transmitter and the receiver is lost, the succeeding symbols would be misinterpreted. Thus the demultiplexer 140 would send the wrong data streams to the data ports 150 and 160. The components described below are provided to regain synchronization.

As previously described the symbols are received at the demodulator 100 at a rate of 1,600 Hz and in addition to appearing at the input to detector 130 they are fed into a frequency detector 170 which, in response, generates an 800 Hz timing signal starting with the first received symbol. The received symbols are also fed into an amplitude detector 180. The amplitude detector, in response to the 800 Hz timing signal, detects the amplitude of the symbols W1, W2, W3 . . . and ignores symbols Z1, Z2, Z3 . . . or it detects the amplitude of symbols Z1, Z2, and Z3. Accumulator/correlator 190 averages the first N amplitudes received from the detector 180 and compares the value thus obtained to a preselected value. If, the first symbol was in fact X1 and most of the subsequent symbols detected by amplitude detector 180 were also X's then the average or correlated value of the N symbols will be determined as R. The accumulator/correleator 190 continuously correlates the last N alternate received symbols If the averaged value of the correlator approaches R' synchronization has been lost so that the receiver is translating the Z's as X's and the W's as Y's and the data is not received at the correct ports.

In order to correct this condition, the accumulator/correlator sends a signal to the demultiplexer 140 which effects a change in the demultiplexing phase resulting in the data appearing at the correct ports. Thus the receiver is able to synchronize itself to the transmitter.

The difference between R and R' is important. If the difference is small, the number of symbols that must be correlated is necessarily large to insure the accuracy of the correlator. However, as the difference is increased, there will be a degradation in the received data error rate. Therefore, depending upon the application a compromise must be reached.

Although in the preferred embodiment, the radial component is the same for every other point, different arrangements are also possible.

It is also evident that the method described herein can be easily extended to a plurality of data sources, as well as to other types of QAM/PSK modulation.

Other variations of the invention are possible without voilating the scope of the invention as set forth in the appended claims.

I claim:

1. A digital data transmission system employing a QAM or PSK technique of sending concurrently a first series of bits consisting of bits A and a second series of bits consisting of bits B comprising:

a transmitter which transmits symbols X1, Y1, X2, Y2, wherein each of said X symbols corresponds to a first 3-bit group of the form ABA and each of said Y symbols corresponds to a second 3-bit group of the form BAB wherein said bits A are bits from said first series of bits and said bits B are bits from said second series of bits and wherein each of said X and Y symbols are characterized by a radius R and R' respectively; and a receiver which receives a series of received symbols corresponding to said transmitted symbols, and is adapted to separate the series of received symbols into said first series and said second series of bits by determining the radii of every other received signal, correlating the radii of a preselected number of symbols to obtain a correlated value, and generating a synchronizing signal dependent on said correlated value.

2. The system of claim 1 wherein said receiver has means for averaging the radii of said preselecting group of signals.

3. A method of communicating concurrently a first series of bits comprising bits A and a second series of bits comprising bits B, the method of comprising the steps of:

multiplexing said first and said second series of bits into a multiplexed series of bits of the form ABA-BAB;

modulating said multiplexed series of bits into a corresponding series of transmitted symbols of the form X1, Y1, X2, Y2, X3, Y3, each of said X symbols corresponding to ABA bits and each of said Y signals corresponding to BAB bits, said X and Y symbols being equivalent to a point of an 8-point QAM or PSK-type modulation, having a radial component and a phase component, said X symbols having a radial component R and said Y symbols having different radial component R';

sending the transmitted symbols to a receiver;

demodulating said transmitted symbols into a received series of bits;

determining the radii of alternate received signals;

correlating the radii of a preselected number of alternate received signals to obtain a correlated value;

generating a synchronizing signal dependent on said correlated value; and separating said received series of bits into a first output series of bits having bits A and a second output series of bits having bits B in accordance with said synchronizing signal.

4. The method of claim 3 wherein said correlating comprises averaging the radii of said preselected number of alternate received signals.

* * * * *